(12) United States Patent
Chen

(10) Patent No.: US 11,297,302 B2
(45) Date of Patent: Apr. 5, 2022

(54) NAKED-EYE STEREOSCOPIC DISPLAY DEVICE AND NAKED-EYE STEREOSCOPIC DISPLAY SYSTEM WITH PIXEL ZONES OF DIFFERENT PHASE RETARDATION

(71) Applicants: HKC CORPORATION LIMITED, Guangdong (CN); CHONGQING HKC OPTOELECTRONICS TECHNOLOGY CO.,LTD., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 321 days.

(21) Appl. No.: 16/483,846

(22) PCT Filed: Jul. 3, 2017

(86) PCT No.: PCT/CN2017/091525
§ 371 (c)(1),
(2) Date: Aug. 6, 2019

(87) PCT Pub. No.: WO2018/176672
PCT Pub. Date: Oct. 4, 2018

(65) Prior Publication Data
US 2020/0014902 A1 Jan. 9, 2020

(30) Foreign Application Priority Data
Mar. 31, 2017 (CN) .......................... 201710208152.4

(51) Int. Cl.
*G02B 30/26* (2020.01)
*H04N 13/302* (2018.01)
(Continued)

(52) U.S. Cl.
CPC ........... *H04N 13/302* (2018.05); *G02B 30/25* (2020.01); *G02B 30/26* (2020.01); *H04N 13/125* (2018.05); *G09G 2320/0214* (2013.01)

(58) Field of Classification Search
CPC .................... G02B 30/25; G02B 30/26; G09G 2320/0214; H04N 13/125; H04N 13/302
See application file for complete search history.

(56) References Cited

U.S. PATENT DOCUMENTS 6,368,760 B1 * 4/2002 Nishiguchi ............ H04N 13/31
430/20
9,457,523 B2 * 10/2016 Coleman .......... B29D 11/00634
(Continued)

*Primary Examiner* — Ram A Mistry
(74) *Attorney, Agent, or Firm* — Wang Law Firm, Inc.

(57) ABSTRACT

A naked-eye stereoscopic display device is provided herein, which includes: a display panel having a plurality of first pixel zones and second pixel zones, the first and second pixel zones are arranged alternately to be adjacent to one another and form an array; and a phase retardation film disposed on a surface of the display panel, the phase retardation film includes first and second retardation regions, each first retardation region has different value of phase retardation and is corresponding to one of the first pixel zones, and each second retardation region has different value of phase retardation and is corresponding to one of the second pixel zones. A naked-eye stereoscopic display system is also provided herein.

18 Claims, 3 Drawing Sheets

(51) Int. Cl.
*H04N 13/125* (2018.01)
*G02B 30/25* (2020.01)

(56) References Cited

U.S. PATENT DOCUMENTS

| | | | | |
|---|---|---|---|---|
| 2002/0118452 A1* | 8/2002 | Taniguchi | ............... | G02B 30/29 |
| | | | | 359/463 |
| 2011/0310480 A1* | 12/2011 | Hoshi | .................... | G02B 30/25 |
| | | | | 359/465 |
| 2018/0212200 A1* | 7/2018 | Wang | ....................... | C08K 5/23 |

* cited by examiner

NAKED-EYE STEREOSCOPIC DISPLAY DEVICE AND NAKED-EYE STEREOSCOPIC DISPLAY SYSTEM WITH PIXEL ZONES OF DIFFERENT PHASE RETARDATION

CROSS-REFERENCES TO RELATED PATENT APPLICATION

This application is a National Stage Application of PCT International Patent Application No. PCT/CN2017/091525 filed on Jul. 3, 2017, which claims priority to and the benefit of Chinese Patent Application No. 201710208152.4, filed on Mar. 31, 2017, and the disclosure of which is incorporated herein in its entirety by reference.

BACKGROUND OF THE INVENTION

1. Field of the Invention

The present application is related to electronics, and more specifically, the present application is related to a naked-eye stereoscopic display device and a naked-eye stereoscopic display system.

2. Description of the Related Art

In recent years, the demand for liquid crystal panels that is disposed with a naked-eye stereoscopic display device is surging. The naked-eye stereoscopic display device is a new generation of autostereoscopic display device that takes advantage of the stereoscopy mechanism of human eyes, and such display device is capable of displaying image depth, without the use of other assisting devices (e.g. 3D glasses, headgear, etc.), to the viewer via multi-channel auto-stereoscopy technique.

As the technology of curved display device matures over all these years, the curved naked-eye stereoscopic display is gradually becoming the new direction in product development; examples of the recently developed products include TVs, monitors and mobile devices with the curved naked-eye stereoscopic display. In addition, although designers have been focusing on developing a new system that combines the polarized 3D display and the curved screen, the polarized 3D display with curved screen is still troubled by 3D crosstalk in certain degree, and hence, the viewers' eyes will feel discomfort and viewing experience will be compromised.

SUMMARY OF THE INVENTION

The present application discloses a naked-eye stereoscopic display device and system, which are capable of reducing the effect of 3D crosstalk to users, so as to improve users' viewing experience.

In one aspect, a naked-eye stereoscopic display device is provided in the embodiment of the present application, which may include: a display panel that has a plurality of first pixel zones and second pixel zones, the first and second pixel zones may be arranged alternately to be adjacent to one another to form an array; and a phase retardation film that is disposed on a surface of the display panel, the phase retardation film may include first and second retardation regions, each of the first retardation region may have a different value of phase retardation and may be corresponding to one of the first pixel zones, and each of the second retardation region may have a different value of phase retardation and may be corresponding to one of the second pixel zones.

In the other aspect, the embodiment of the present application further provides a naked-eye stereoscopic display device, which may include:

a display panel, the display panel may have a plurality of first and second pixel zones, the first pixel zones and the second pixel zones may be alternately arranged to be adjacent to one another to form an array;

a phase retardation film disposed on a surface of the display panel, the phase retardation film may include a plurality of first retardation regions and second retardation regions, each of the first retardation regions may have a different value of phase retardation and may be corresponding to one of the first pixel zones, and each of the second retardation regions may have a different value of phase retardation and may be corresponding to one of the second pixel zones; and a backlight device, the backlight device may be disposed at another surface of the display panel to provide backlight to the display panel;

in particular, different one of first pixel zones and different ones of the second pixel zones may have different curvatures; the value of phase retardation of each of the first retardation regions may change as the curvature of the corresponding first pixel zone changes; and the value of phase retardation of each of the second retardation regions may change as the curvature of the corresponding second pixel zone changes;

the display panel may include: an active element array substrate having an active element array; an opposing substrate; and a display layer that is interposed between the active element array substrate and the opposing substrate.

Yet in another aspect, the embodiment of the present application further provides a naked-eye stereoscopic display system, which may include:

a naked-eye stereoscopic display device;

a controller that may be electrically connected to the naked-eye stereoscopic display device to control the operating state thereof;

the naked-eye stereoscopic display device may include:

a display panel, the display panel having a plurality of first pixel zones and second pixel zones, wherein the first pixel zones and the second pixel zones are alternately arranged to be adjacent to one another to form an array; and a phase retardation film disposed on a surface of the display panel, the phase retardation film may include a plurality of first retardation regions and second retardation regions, each of the first retardation regions may have a different value of phase retardation and may be corresponding to one of the first pixel zones, and each of the second retardation regions may have a different value of phase retardation and may be corresponding to one of the second pixel zones.

The present application is structurally simple, and is capable of reducing the effect of 3D crosstalk to users, so as to improve users' viewing experience. In particular, since different first and pixel zones have different values of phase retardation, and since the value of phase retardation varies as the curvature of the display panel varies, the effect of 3D crosstalk can be mitigated effectively.

BRIEF DESCRIPTION OF THE DRAWINGS

In order to illustrate the technical feature of the present application in a clear manner, brief introductions for the drawings that accompany the illustrations of the embodiments will be given hereinafter; it is appreciated that the following drawings are merely for some embodiments of the present application, and a person skilled in the art can come up with other drawings according to the drawings provided herein without much inventive endeavors.

DESCRIPTION OF THE PREFERRED EMBODIMENTS

The following contents combined with the drawings for the embodiments of the present application serve to illustrate the technical features of the present application in a clear and thorough manner; it is apparent that the embodiments discoursed hereinafter is just part of the embodiments of the present application, and should not be construed as all of the embodiments of the present application. It is understood that any other embodiments that are derived from what is disclosed within this application without contributing any inventive endeavor, shall fall within the scope the present application claims.

It should be understood that the terms "comprise" and "include", when used in this specification, specify the presence of stated features, integers, steps, operations, elements, and/or components, but do not preclude the presence or addition of one or more other features, integers, steps, operations, elements, components, and/or groups thereof.

It should also be understood that the terminology used herein is for the purpose of describing particular exemplary embodiments only and is not intended to be limiting of the invention. As used in the disclosure and the appended claims, the singular forms "a," "an" and "the" are intended to include the plural forms as well, unless the context clearly indicates otherwise. It can also be appreciated that the terminologies "and/or" used in the disclosure and the appended claims refers to the combination and all possible combinations of one or more items listed therein, and they include said combinations.

Figure 1:
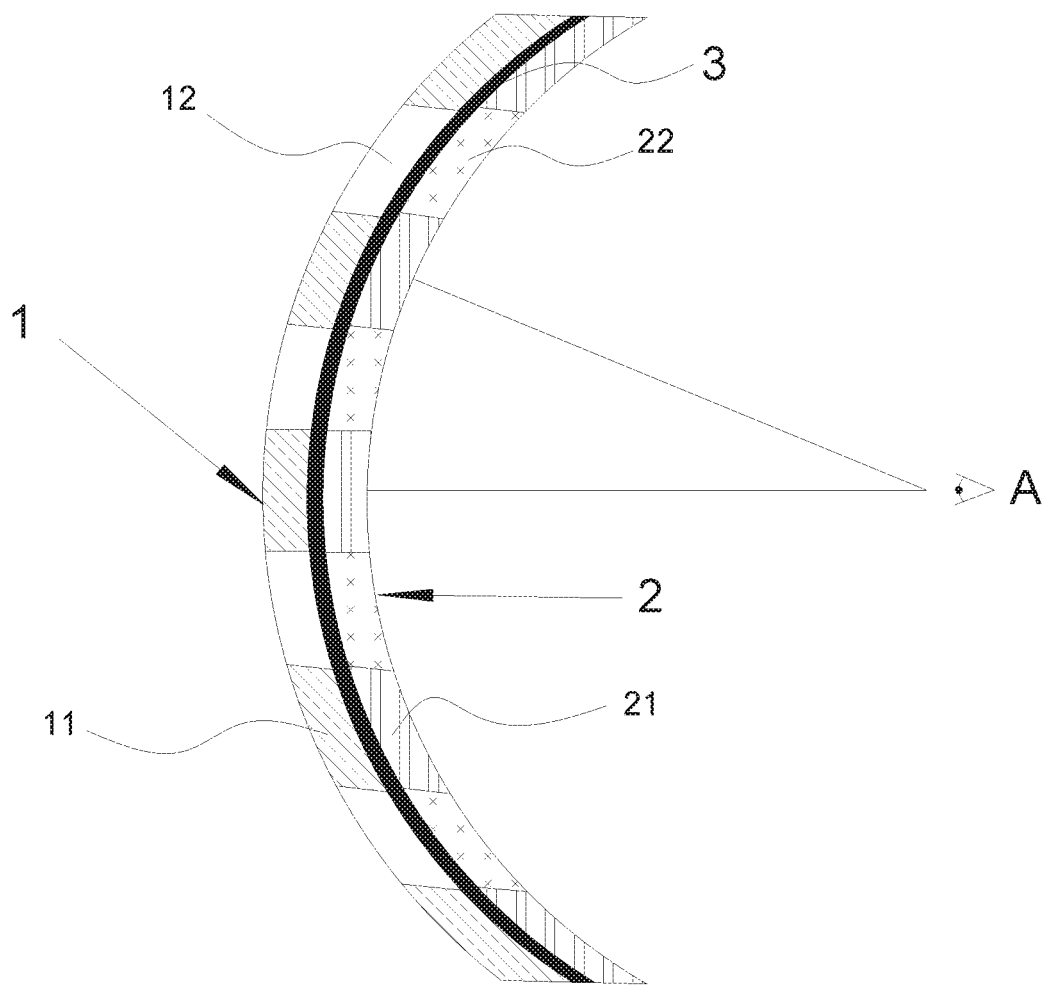
FIG. 1 is a structural schematic diagram of the naked-eye stereoscopic display device of the present embodiment.

As shown in FIG. 1, which is the structural schematic diagram of the naked-eye stereoscopic display device of the present embodiment, the naked-eye stereoscopic display device may include: a display panel 1 that has a plurality of first pixel zones 11 and second pixel zones 12, the first and second pixel zones may be arranged alternately to be adjacent to one another to form an array; and a phase retardation film 2 that is disposed on a surface of the display panel 1, the phase retardation film may include first 21 and second retardation regions 22, each first retardation region 21 may have a different value of phase retardation and may be corresponding to one of the first pixel zones 11, and each second retardation region 22 may have a different value of phase retardation and may be corresponding to one of the second pixel zones 12.

Particularly, the first and second pixel zones of the display panel 1 may be arranged alternately to be adjacent to one another and form an array, such that when the viewer's eyes A is looking at the display panel, the right eye can receive image information transmitted from the first pixel zones while the left eye can receive image information transmitted from the second pixel zones, and thus the image information received by the viewer can be compounded into a 3D image. In order to prevent 3D crosstalk when different pixel zones are transmitting the corresponding image information, the surface of the display panel is configured in such a way that the phase retardation film on different retarding zones has different values of phase retardation, so as to compensate for the image information in different pixel zones at different positions accordingly. From experimentations, the optimum value of phase retardation for pixel zones at different positions in the display panel can be obtained, so that configurations can be performed accordingly.

In some embodiments, different first pixel zones and different second pixel zones may correspond to different curvatures. Generally speaking, for those naked-eye stereoscopic display device in the prior arts, the display panels thereof are curved, and different points on the curved display panel may have different curvatures; i.e. different first pixel zones may correspond to different curvatures, and different second pixel zones may also correspond to different curvatures.

In some embodiments, the display panel 1 may be liquid crystal display panel, OLED, QLED or other types of display panel.

In some embodiments, the value of phase retardation of each of the first retardation regions may change as the curvature of the corresponding first pixel zone changes; and the value of phase retardation of each of the second retardation regions may change as the curvature of the corresponding second pixel zone changes.

Generally, when the viewer's eyes is viewing the screen, the eyes A will be situated at the center of display panel, and the phase retardation values of image information of the first pixel zones, which have different curvatures, has to match that of the first retardation regions corresponding to the first pixel zones; similarly, the phase retardation values of image information of the second pixel zones, which have different curvatures, has to match that of the second retardation regions corresponding to the second pixel zones.

Figure 2:
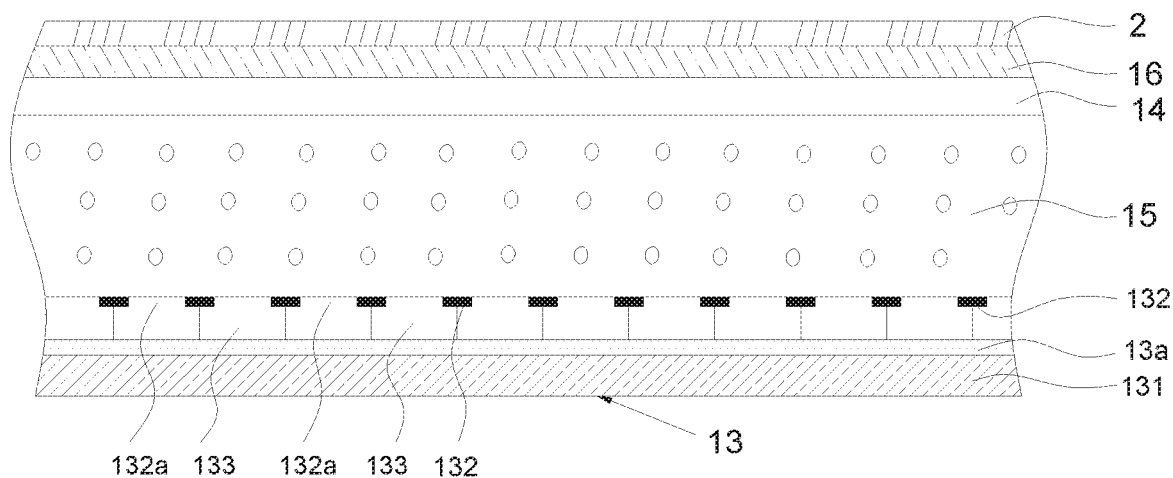
FIG. 2 is a sectional view of the naked-eye stereoscopic display device of the present embodiment.

As shown in FIG. 2, optionally, the display panel 1 may include: an active element array substrate 13 that has active element array 13a; an opposing substrate 14; and a display layer 15 that is interposed between the active element array substrate 13 and the opposing substrate 14.

The active element array substrate 13 may include: a first substrate 131, on which the active element array 13a is disposed; a black matrix 132 having a plurality of openings 132a; a plurality of color filters 133, which are disposed on the active element array 13a, each of the color filters 133 may correspond to one of the openings 132a, and each neighboring pair of the color filters 133 may respectively correspond to one of the first pixel zones 11 and one of the second pixel zones 12. The black matrix may serve as a light shielding element, which effectively divides the light emitted from the active element array to form the first and second pixel zones, which emit their respective image information; as such, the right eye may receive the image information from the first pixel zones, and the left eye may receive the image information from the second pixel zones.

Figure 3:
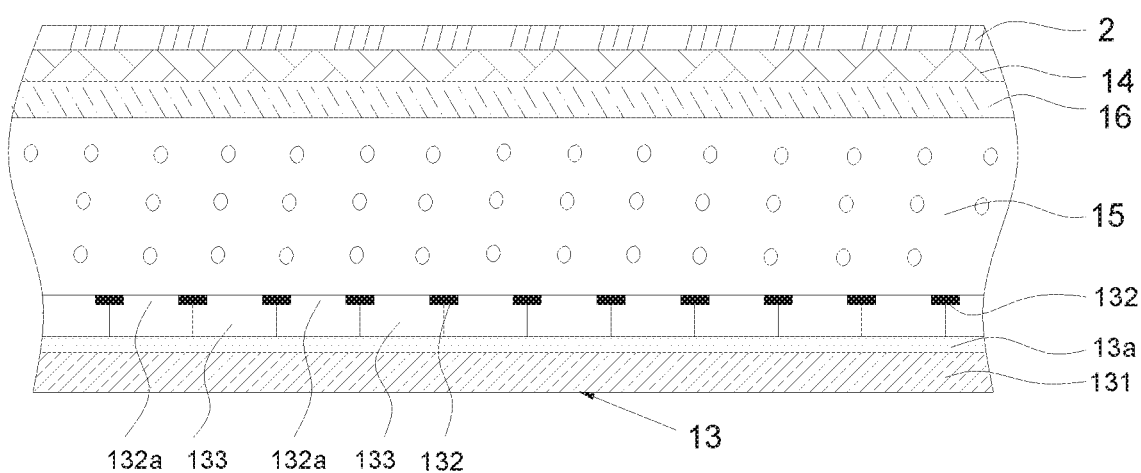
FIG. 3 is another sectional view of the naked-eye stereoscopic display device of the present embodiment.

Furthermore, the display panel 1 may further include a polarizer 16, which may be interposed between the opposing substrate 14 and the phase retardation film 2. Apart from that, as shown in FIG. 3, the display panel 1 may also include a polarizer 16, which may be interposed between the opposing substrate 14 and the display layer 15. The position of the polarizer 16 may be adjusted according to the actual condition.

More specifically, the display layer 15 may be a liquid crystal layer, an electrophoretic layer, an electrowetting layer or an electroluminescent layer. The type of display layer 15 may be selected according to the actual condition, and the types of display layer are not limited to those aforementioned.

In some embodiment, the naked-eye stereoscopic display device may also include a backlight module, which may be located at the other surface of the display panel. The display panel 1 may be a liquid crystal display panel, and the backlight module may supply backlight to the liquid crystal display panel (display panel 1).

Figure 4:
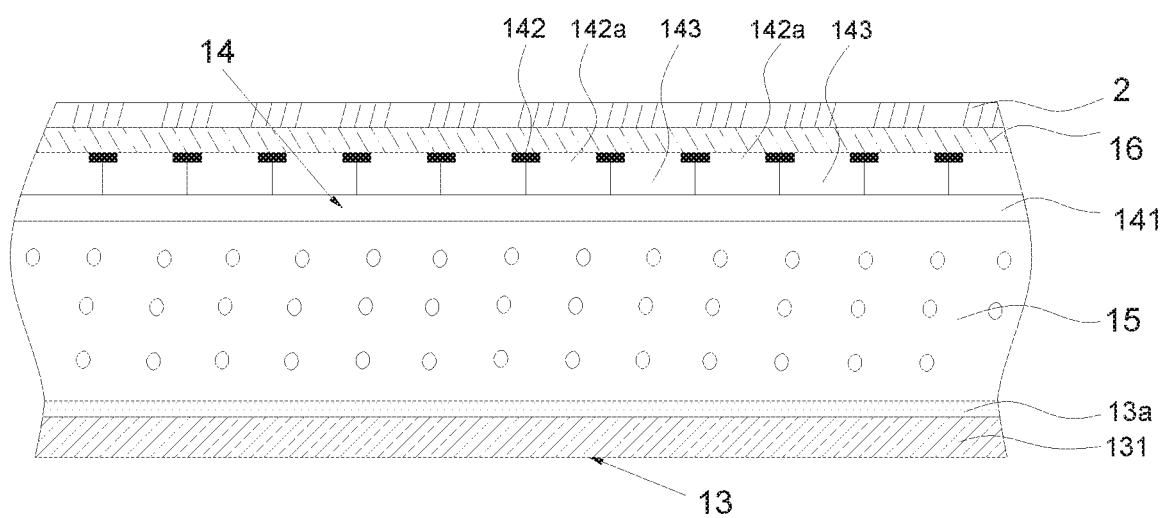
FIG. 4 is a sectional view of the naked-eye stereoscopic display device of another embodiment.

In some embodiments, the opposing substrate 14 as shown in FIG. 4 may include: a second substrate 141; a black matrix 142 with a plurality of openings 142a; and a plurality of color filters 143, which may be disposed on the second substrate 141; each color filter 143 may correspond to one of the openings 142a, and each neighboring pair of the color filters 143 may correspond to one of the first pixel zones 11 and one of the second pixel zones 12.

The black matrix may serve as a light shielding element, which effectively divides the light emitted from the active element array to form the first and second pixel zones, which emit their respective image information; as such, the right eye may receive the image information from the first pixel zones, and the left eye may receive the image information from the second pixel zones.

The display panel 1 may further include a polarizer 16, which may be interposed between the second substrate 141 and the phase retardation film 2. The position of the polarizer may be adjusted according to the actual condition and is not limited to what is disclosed herein.

In conclusion, the present application is structurally simple, and is capable of reducing the effect of 3D crosstalk to users, so as to improve users' viewing experience. In particular, since different first and pixel zones have different values of phase retardation, and since the value of phase retardation varies as the curvature of the display panel varies, the effect of 3D crosstalk can be mitigated effectively.

The present application further provides a naked-eye stereoscopic display system, which may include a naked-eye stereoscopic display device and a controller; the controller may be electrically coupled to the naked-eye stereoscopic display device to control the operating state of the naked-eye stereoscopic display device.

More specifically, in the present embodiment, the naked-eye stereoscopic display device as shown in FIG. 1 may include: a display panel 1 having a plurality of first pixel zones 11 and second pixel zones 12, the first and second pixel zones 11 and 12 are arranged alternately to be adjacent to one another and form an array; and a phase retardation film 2 that may be disposed on a surface of the display panel; particularly, the phase retardation film 2 may include a plurality of first and second retardation regions 21 and 22, each of the first retardation region 21 has a different value of phase retardation and is corresponding to one of the first pixel zones 11, and each of the second retardation region 22 has a different value of phase retardation and is corresponding to one of the second pixel zones 12. It should be clarified that, in the foregoing embodiments, the description of each embodiment has its emphasis, and for a part that is not described in detail in a certain embodiment, reference may be made to the relevant description of other embodiments.

The foregoing descriptions are merely specific exemplary embodiments of the present application, and they are not intended to limit the protection scope of the present invention; any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A naked-eye stereoscopic display device, comprising:
a display panel having a plurality of first pixel zones and second pixel zones, wherein the first pixel zones and the second pixel zones are alternately arranged to be adjacent to one another to form an array; and
a phase retardation film disposed on a surface of the display panel, wherein the phase retardation film comprises a plurality of first retardation regions and second retardation regions, each of the first retardation regions has a different value of phase retardation and is disposed to correspond to one of the first pixel zones, and each of the second retardation regions has a different value of phase retardation and is disposed to correspond to one of the second pixel zones,
wherein different ones of the first pixel zones and different ones of the second pixel zones have different curvatures, and
wherein the value of phase retardation of each of the first retardation regions changes as the curvature of the corresponding first pixel zone changes.

2. The naked-eye stereoscopic display device of claim 1, wherein:
the value of phase retardation of each of the second retardation regions changes as the curvature of the corresponding second pixel zone changes.

3. The naked-eye stereoscopic display device of claim 1, wherein the display panel comprises:
an active element array substrate having an active element array;
an opposing substrate; and
a display layer interposed between the active element array substrate and the opposing substrate.

4. The naked-eye stereoscopic display device of claim 3, wherein the active element array substrate comprises:
a first substrate for disposing the active element array;
a black matrix with a plurality of openings; and
a plurality of color filters configured to be disposed on the active element array, each of the color filters corresponds to one of the openings, and each neighboring pair of the color filters respectively corresponds to one of the first pixel zones and one of the second pixel zones.

5. The naked-eye stereoscopic display device of claim 4, wherein the display panel further comprises:
a polarizer interposed between the opposing substrate and the phase retardation film.

6. The naked-eye stereoscopic display device of claim 4, wherein the display panel further comprises:
a polarizer interposed between the opposing substrate and the display layer.

7. The naked-eye stereoscopic display device of claim 3, wherein the opposing substrate comprises:
a second substrate;
a black matrix with a plurality of openings; and
a plurality of color filters configured to be disposed on the second substrate, each of the color filters corresponds to one of the openings, and each adjacent pair of the color filters respectively corresponds to one of the first pixel zones and one of the second pixel zones.

8. The naked-eye stereoscopic display device of claim 7, wherein the display panel further comprises:

a polarizer interposed between the second substrate and the phase retardation film.

9. The naked-eye stereoscopic display device of claim 3, wherein the display layer is a liquid crystal layer, an electrophoretic layer, an electrowetting layer or an electroluminescent layer.

10. A naked-eye stereoscopic display device, comprising:
a display panel having a plurality of first pixel zones and second pixel zones, wherein the first pixel zones and the second pixel zones are alternately arranged to be adjacent to one another to form an array; and
a phase retardation film disposed on a surface of the display panel, wherein the phase retardation film comprises a plurality of first retardation regions and second retardation regions, each of the first retardation regions has a different value of phase retardation and is disposed to correspond to one of the first pixel zones, and each of the second retardation regions has a different value of phase retardation and is disposed to correspond to one of the second pixel zones;
wherein different ones of the first pixel zones and different ones of the second pixel zones have different curvatures; the value of phase retardation of each of the first retardation regions changes as the curvature of the corresponding first pixel zone changes; and the value of phase retardation of each of the second retardation regions changes as the curvature of the corresponding second pixel zone changes;
the display panel comprises: an active element array substrate having an active element array; an opposing substrate; and a display layer interposed between the active element array substrate and the opposing substrate.

11. A naked-eye stereoscopic display system, comprising:
a naked-eye stereoscopic display device; and
a controller electrically connected to the naked-eye stereoscopic display device to control the operating state thereof;
the naked-eye stereoscopic display device comprising:
a display panel having a plurality of first pixel zones and second pixel zones, wherein the first pixel zones and the second pixel zones are alternately arranged to be adjacent to one another to form an array; and
a phase retardation film disposed on a surface of the display panel, wherein the phase retardation film comprises a plurality of first retardation regions and a plurality of second retardation regions, each of first retardation regions has a different value of phase retardation and is disposed to correspond to one of the first pixel zones, and each of second retardation regions has a different value of phase retardation and is disposed to correspond to one of the second pixel zones,
wherein different ones of the first pixel zones and different ones of the second pixel zones have different curvatures, and
wherein the value of phase retardation of each of the first retardation regions changes as the curvature of the corresponding first pixel zone changes.

12. The naked-eye stereoscopic display system of claim 11, wherein:
the value of phase retardation of each of the second retardation regions changes as the curvature of the corresponding second pixel zone changes.

13. The naked-eye stereoscopic display system of claim 11, wherein the display panel comprises:
an active element array substrate having an active element array;
an opposing substrate; and
a display layer interposed between the active element array substrate and the opposing substrate.

14. The naked-eye stereoscopic display system of claim 13, wherein the active element array substrate comprises:
a first substrate for disposing the active element array;
a black matrix with a plurality of openings; and
a plurality of color filters configured to be disposed on the active element array, each of the color filters corresponds to one of the openings, and each neighboring pair of the color filters corresponds to one of the first pixel zones and one of the second pixel zones.

15. The naked-eye stereoscopic display system of claim 14, wherein the display panel further comprises:
a polarizer interposed between the opposing substrate and the phase retardation film.

16. The naked-eye stereoscopic display system of claim 14, wherein the display panel further comprises:
a polarizer interposed between the opposing substrate and the display layer.

17. The naked-eye stereoscopic display system of claim 13, wherein the opposing substrate comprises:
a second substrate;
a black matrix with a plurality of openings; and
a plurality of color filters configured to be are disposed on the second substrate, each of the color filters corresponds to one of the openings, and each adjacent pair of the color filters respectively corresponds to one of the first pixel zones and one of the second pixel zones.

18. The naked-eye stereoscopic display system of claim 17, wherein the display panel further comprises:
a polarizer interposed between the second substrate and the phase retardation film.

* * * * *